United States Patent
Ukumori et al.

(10) Patent No.: US 12,195,211 B2
(45) Date of Patent: Jan. 14, 2025

(54) METHOD OF CONTROLLING FLYING OBJECT, FLYING OBJECT, AND COMPUTER PROGRAM

(71) Applicant: GS Yuasa International Ltd., Kyoto (JP)

(72) Inventors: Nan Ukumori, Kyoto (JP); Daisuke Konishi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 17/919,016

(22) PCT Filed: Apr. 6, 2021

(86) PCT No.: PCT/JP2021/014569
§ 371 (c)(1),
(2) Date: Oct. 14, 2022

(87) PCT Pub. No.: WO2021/210447
PCT Pub. Date: Oct. 21, 2021

(65) Prior Publication Data
US 2023/0249850 A1 Aug. 10, 2023

(30) Foreign Application Priority Data
Apr. 17, 2020 (JP) .................. 2020-074284

(51) Int. Cl.
*B64U 50/31* (2023.01)
*B64U 50/13* (2023.01)
*B64U 50/19* (2023.01)
*H01M 10/48* (2006.01)

(52) U.S. Cl.
CPC ............. *B64U 50/13* (2023.01); *B64U 50/19* (2023.01); *B64U 50/31* (2023.01); *H01M 10/48* (2013.01); *B64U 2201/20* (2023.01)

(58) Field of Classification Search
CPC ................................ B64U 50/31; B64U 50/19
See application file for complete search history.

(56) References Cited

U.S. PATENT DOCUMENTS

| | | | |
|---|---|---|---|
| 5,744,936 A | 4/1998 | Kawakami | |
| 11,164,464 B1 * | 11/2021 | Marriott | G08G 5/0034 |
| 11,308,814 B2 * | 4/2022 | Fujii | H04L 67/125 |

(Continued)

FOREIGN PATENT DOCUMENTS

| | | | |
|---|---|---|---|
| CA | 3071151 A1 * | 1/2019 | G01R 31/3647 |
| CN | 105026262 A * | 11/2015 | B64C 39/024 |

(Continued)

OTHER PUBLICATIONS

International Search Report and Written Opinion for International Application No. PCT/JP2021/014569, dated Jun. 15, 2021, (8 pages), Japan Patent Office, Tokyo, Japan.

*Primary Examiner* — Christopher P Ellis
(74) *Attorney, Agent, or Firm* — Alston & Bird LLP (57) ABSTRACT

In a method of controlling a flying object 1, from the flying object 1 that includes a flying object propulsion apparatus 16 and an energy storage apparatus 7, 8 having a plurality of energy storage devices 6 and configured to supply electricity to the flying object propulsion apparatus 16, one or a plurality of the energy storage devices 6 are separated.

10 Claims, 5 Drawing Sheets

(56) References Cited

U.S. PATENT DOCUMENTS

| | | | |
|---|---|---|---|
| 2001/0035737 A1 | 11/2001 | Nakanishi et al. | |
| 2003/0209375 A1 | 11/2003 | Suzuki et al. | |
| 2006/0012330 A1 | 1/2006 | Okumura et al. | |
| 2014/0242420 A1 | 8/2014 | Schaffner et al. | |
| 2014/0377594 A1 | 12/2014 | Suzuki | |
| 2020/0380874 A1* | 12/2020 | Fujii | G08G 5/0013 |
| 2021/0078439 A1* | 3/2021 | Hashimoto | H04B 7/18504 |
| 2021/0078730 A1* | 3/2021 | Tajika | B60L 8/003 |
| 2021/0091848 A1* | 3/2021 | Cai | H04B 7/18504 |
| 2021/0269152 A1* | 9/2021 | Wankewycz | B64D 29/02 |
| 2021/0309122 A1 | 10/2021 | Wake et al. | |
| 2021/0341948 A1* | 11/2021 | Lau | G05D 1/0688 |
| 2021/0344080 A1* | 11/2021 | Zhang | H01M 50/434 |
| 2021/0344215 A1* | 11/2021 | Prabhu | H02J 7/35 |
| 2021/0376600 A1* | 12/2021 | Torres | H02H 9/046 |
| 2022/0041299 A1* | 2/2022 | Wankewycz | B64D 37/14 |
| 2022/0116280 A1* | 4/2022 | Zhang | H04W 24/02 |
| 2023/0331376 A1* | 10/2023 | Ensslin | B64C 25/50 |

FOREIGN PATENT DOCUMENTS

| | | | |
|---|---|---|---|
| JP | H06-283210 A | 10/1994 | |
| JP | 2001057711 A | 2/2001 | |
| JP | 2001-185228 A | 7/2001 | |
| JP | 2002015781 A | 1/2002 | |
| JP | 2004185915 A | 7/2004 | |
| JP | 2012-244837 A | 12/2012 | |
| JP | 2013-135533 A | 7/2013 | |
| JP | 2014-197533 A | 10/2014 | |
| JP | 2015-006095 A | 1/2015 | |
| JP | 2017-109512 A | 6/2017 | |
| JP | 2018-177135 A | 11/2018 | |
| JP | 2019-054490 A | 4/2019 | |
| WO | WO 2018/142925 A1 | 8/2018 | |
| WO | WO-2019155872 A1 * | 8/2019 | B64C 39/02 |
| WO | WO-2019/189075 A1 | 10/2019 | |

* cited by examiner

METHOD OF CONTROLLING FLYING OBJECT, FLYING OBJECT, AND COMPUTER PROGRAM

CROSS REFERENCE TO RELATED APPLICATIONS

This application is a National Stage Application, filed under 35 U.S.C. § 371, of International Application No. PCT/JP2021/014569, filed Apr. 6, 2021, which claims priority to Japanese Application No. 2020-074284, filed Apr. 17, 2020; the contents of both of which are hereby incorporated by reference in their entirety.

BACKGROUND

Technical Field

The present invention relates to a method of controlling a flying object, and a flying object.

Description of Related Art

In recent years, various electric flying objects have been developed. An unmanned airplane such as a drone includes a secondary battery and a battery control circuit. A motor is rotated by discharging the secondary battery, and a rotary blade is rotated by rotation of the motor. To ensure a predetermined millage while suppressing an increase in weight, the secondary battery is required to have higher energy density more than ever.

There has been also developed a high-altitude platform station (HAPS), stratosphere platform station, that mounts a wireless relay station and flies or glides in an airspace in the stratosphere having an altitude of 11 km to 50 km (see, for example, Patent Document JP-A-2019-54490). Various types of HAPS such as solar planes, airships, stratospheric jet planes have been developed. The HAPS stays in the stratosphere at an altitude of 20 km, for example, during its operation (while functioning as a communication infrastructure). The HAPS can be simultaneously connected with a large number of terminal apparatuses in a wide range. Accordingly, by realizing the communication between HAPS and artificial satellites and ground stations, a high-speed communication infrastructure can be constructed. A stable communication environment can be maintained also when a disaster occurs.

The HAPS may include; a solar panel having solar cells and an energy storage apparatus having energy storage devices such as lithium ion secondary batteries. The HAPS may fly in the stratosphere using electricity generated by a solar panel at daytime, and may fly in the stratosphere by electricity discharged from an energy storage apparatus at night. The energy storage device that the HAPS includes is required to have a high discharge capacity (full charge capacity) in order to make a large-sized flying object keep flying at night.

BRIEF SUMMARY

There is a case where an incident such as an internal short-circuit occurs so that a state of health (SOH) is lowered. The inventors of the present invention have studied a measure for making the HAPS keep flying in such a case. Also with respect to flying objects other than the HAPS, it is expected the similar needs will increase in the future.

Accordingly, it is an object of the present invention to provide a method of controlling a flying object and a flying object that contribute to the enhancement of reliability of flight.

According to an aspect of the present invention, there is provided a method of controlling a flying object that includes a flying object propulsion apparatus and an energy storage apparatus having a plurality of energy storage devices and configured to supply electricity to the flying object propulsion apparatus, wherein the method comprises a step of separating one or a plurality of the energy storage devices.

According to an aspect of the present invention, there is provided a flying object comprising: a generator having a solar cell and configured to supply electricity to a flying object propulsion apparatus; an energy storage apparatus having a plurality of energy storage devices and configured to supply electricity to the flying object propulsion apparatus; and a conveyance apparatus configured to convey one or a plurality of the energy storage devices separated from the energy storage apparatus.

According to the above-mentioned aspects, reliability of flight can be enhanced.

DETAILED DESCRIPTION OF VARIOUS EMBODIMENTS

Overall Configuration of Embodiments

According to an embodiment, there is provided a method of controlling a flying object that includes a flying object propulsion apparatus and an energy storage apparatus having a plurality of energy storage devices and configured to supply electricity to the flying object propulsion apparatus, wherein the method comprises a step of separating one or a plurality of the energy storage devices.

Examples of the flying object propulsion apparatus include a motor that rotates a propeller, for example. Alternatively, the flying object propulsion apparatus may be a hybrid propulsion apparatus having an internal combustion engine and a motor for assisting propulsion.

As the energy storage apparatus, for example, a battery cell (energy storage device) such as a lithium ion secondary battery, a battery module in which a plurality of battery cells are connected in series and/or in parallel, a structure in which a plurality of battery modules are connected in series (also referred to as a bank or a string), or a structure in which banks are connected in parallel may be used.

The flying object may be, for example, an HAPS or an electric vertical takeoff and landing aircraft (eVTOL). However, the flying object is not limited to the HAPS and the eVTOL.

With such a configuration, by separating the energy storage device from the flying object, the weight of the flying object can be reduced. Accordingly, it is possible to make the flying object keep flying or to extend a mileage of the flying object. In this manner, the reliability of the flight and the robustness of the flying object can be enhanced. Further, the reliability of the operation of the flying object can be enhanced.

In the method of controlling a flying object described above, one or a plurality of energy storage devices may be separated from the flying object in a case where an internal short-circuit has occurred, a temperature of the energy storage device is equal to or above a first threshold, an SOH is equal to or below a second threshold, or a state of charge (SOC) is equal to or below a third threshold.

Examples of the SOH include a capacity retention ratio, a resistance value, a change in shape, and the like. As the change in shape, a change in an amount of displacement of an element of the energy storage device by swelling or the like, a change in an amount of displacement of a case that accommodates the element, a change in force (reaction force) that expands outward, a change in pressure applied to at least one surface of the energy storage device, or a combination of these changes are named.

As the first threshold, for example, an upper limit value of a temperature range in which charge and discharge can be continued is named.

As the second threshold, for example, a lower limit value of a range of an SOH in which charge and discharge can be continued, and a lower limit value of a range of discharge capacity (full charge capacity) required for performing a flight operation are named.

As the third threshold, for example, an SOC corresponding to a lower limit voltage of a voltage range in which charge and discharge can be reversibly repeated is named.

In a case where the conveyance apparatus (for example, another flying object) that separates the energy storage device and conveys the separated energy storage device to the target landing point requires electricity, the SOH and the SOC required for landing of the conveyance apparatus are obtained in advance by simulation, and the second threshold and the third threshold are set by also taking into account the SOH and the SOC obtained by simulation.

By separating the energy storage device whose SOC is equal to or below the third threshold, it is possible to make the flying object keep flight or extend a mileage distance. Accordingly, the reliability of the flight can be enhanced. In a case where a temperature of the energy storage device is equal to or above the first threshold or the SOH of the energy storage device is equal to or below the second threshold so that the degree of deterioration is large, or an internal short-circuit has occurred, such energy storage device is separated from the flying object, and charge and discharge are continued by other energy storage devices. Accordingly, it is possible to make the flying object keep flying or extend the mileage of the flying object and hence, the reliability of the flight can be enhanced.

According to an embodiment, there is provided a flying object comprising: a generator having a solar cell and configured to supply electricity to a flying object propulsion apparatus; an energy storage apparatus having a plurality of energy storage devices and configured to supply electricity to the flying object propulsion apparatus; and a conveyance apparatus configured to convey one or plurality of the energy storage devices separated from the energy storage apparatus.

With such a configuration, by separating the energy storage device from the flying object, the weight of the flying object can be reduced. Accordingly, it is possible to make the flying object keep flying or to extend a mileage of the flying object. By separating the energy storage device which is deteriorated or in which an internal short-circuit occurs from the flying object and by continuing charge and discharge using other energy storage devices, it is possible to make the flying object keep flying or extend its mileage thus enhancing reliability of the flight. The reuse and reutilization of the conveyed energy storage device may be considered.

As the generator, for example, a solar panel may be used where a plurality of modules in each of which solar cell are arranged are connected to each other in parallel.

As the conveyance apparatus, a glider, a parachute, and a drone are named. The glider and the parachute do not require a drive device and hence, these apparatuses are lightweight. The drone is also lightweight and hence, the drone can be mounted on the flying object or can be connected to the flying object. In the case of a drone, a drone includes a drive device and a controller. Accordingly, the drone can convey the energy storage device to a target landing point with higher accuracy.

The energy storage device may be housed in a glider, or the energy storage device may be connected to a parachute or a drone. In this case, the energy storage device can be separated from the flying object by separating the glider, the parachute, or the drone from the flying object.

The flying object described above may include a wireless relay station that performs wireless communication with a terminal apparatus.

The terminal apparatus may be a mobile phone such as a smartphone, a mobile terminal apparatus such as a notebook personal computer or a tablet, or a communication terminal apparatus that a drone or the like includes.

The wireless relay station performs wireless communication with a terminal apparatus that a user aboard an airplane flying in an airspace below an airspace in which the wireless relay station stays or the communication terminal apparatus described above. The wireless relay station performs wireless communication with a relay station on a ground or a relay station on a sea. The wireless relay station is connected to a core network of a mobile communication network.

In a case where the flying object is an HAPS that includes a wireless relay station, it is necessary for the flying object to perform a flight operation in a predetermined airspace in the stratosphere. Therefore, by separating the energy storage device from the flying object, the weight of the flying object can be reduced and hence, it is possible to make the flying object keep flying or extend a mileage. In a case where an energy storage device that is in a degraded state or is in a state where an internal short-circuit occurs is generated during the operation of the flying object, the energy storage device is separated from the flying object, charge and discharge of the flying object are continued by other energy storage devices so that the flying object can continue the operation by making the flying object keep flying. With such a configuration, the reliability of the flying object as the communication infrastructure is improved.

In a case where the flying object is a HAPS, the flying object flies in an airspace within a predetermined range. Accordingly, a point where the separated energy storage devices are recovered can be estimated.

In the above-described flying object, the energy storage apparatus may be configured such that a plurality of series connection circuits in each of which a plurality of energy storage devices are connected in series may be connected to each other in parallel, and the series connection circuit may be separated from the energy storage apparatus.

The series connection circuit described above may be a unit in which a plurality of energy storage devices are managed by a battery management unit (BMU) or the like. The series connection circuits may be connected to each other in parallel in a separable manner.

First Embodiment

Figure 1:
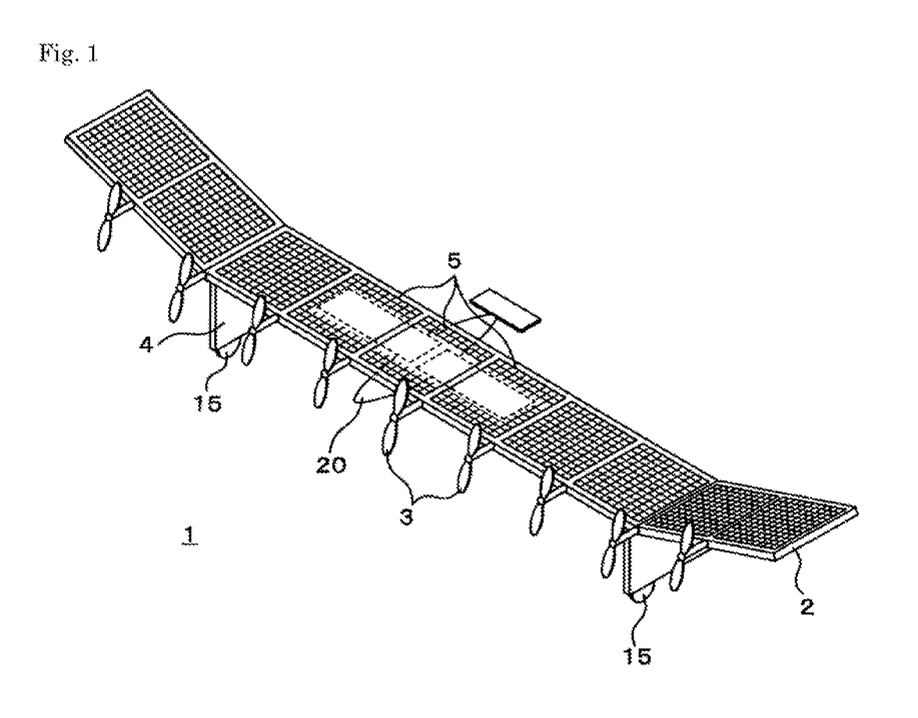
FIG. 1 is a perspective view of a HAPS according to a first embodiment.
Figure 2:
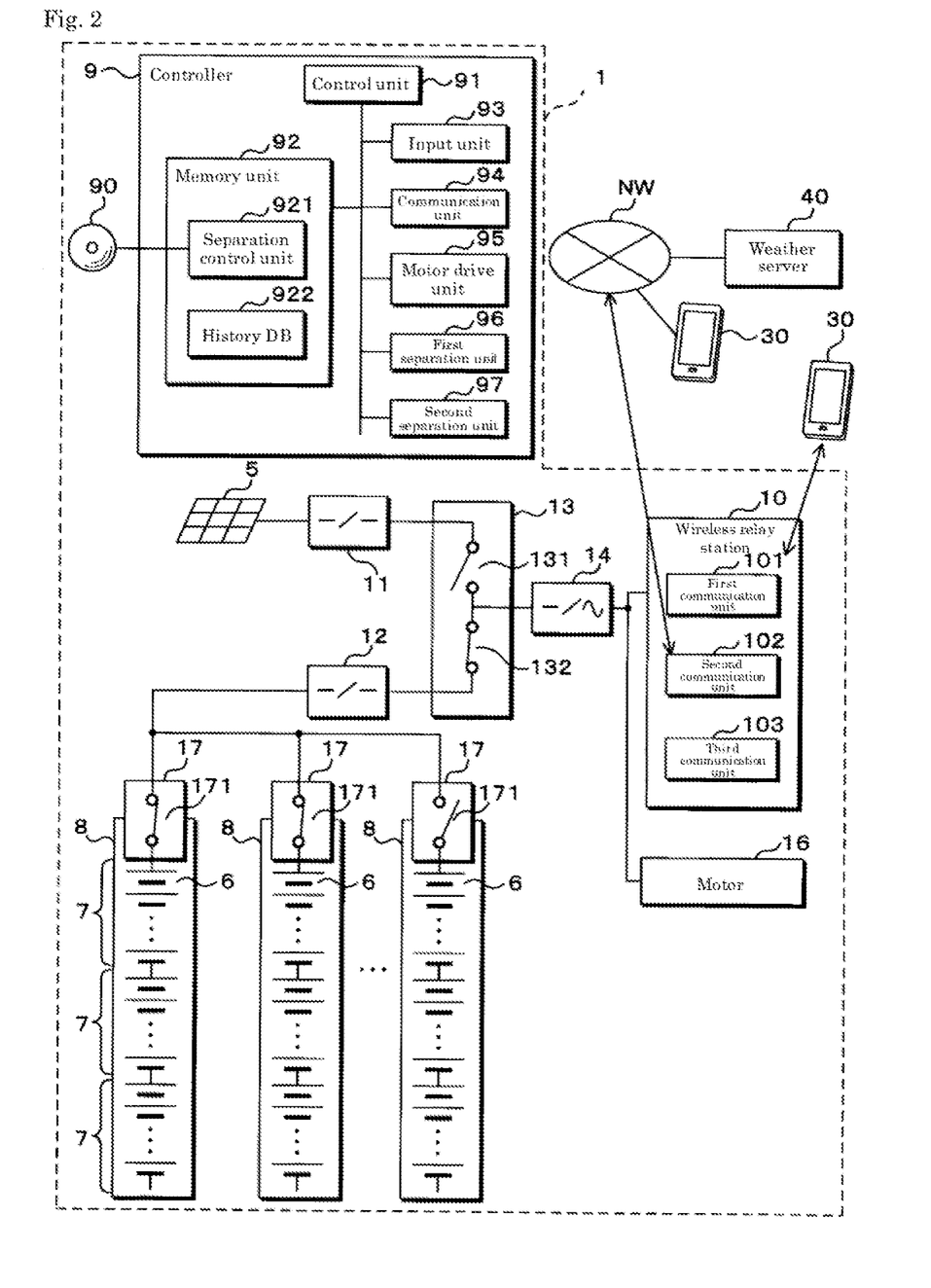
FIG. 2 is a block diagram illustrating the configuration of the HAPS.

The first embodiment will be described by taking a HAPS as an example. FIG. 1 is a perspective view of an external appearance of the HAPS 1, and FIG. 2 is a block diagram illustrating the configuration of the HAPS 1. In FIG. 2, the connections between the controller 9 and respective units are omitted.

The HAPS 1 includes a wing portion 2, a plurality of propellers 3, a plurality of leg portions 4, a plurality of solar panels 5, a plurality of banks 8, a controller 9, a wireless relay station 10, a first converter circuit 11, a second converter circuit 12, a switching unit 13, an inverter circuit 14, wheels 15, a switching unit 17, and a conveyance apparatus 20. The propeller 3 is connected to a motor (electric motor) 16. The configuration of the HAPS 1 is not limited to this example. The banks 8, the controller 9, the wireless relay station 10, the first converter circuit 11, the second converter circuit 12, the switching unit 13, and the inverter circuit 14 are accommodated in leg portions 4. Alternatively, these constituent elements may be disposed in the wing portion 2.

The solar panel 5 may be formed by arranging and connecting a plurality of modules in each of which silicon-based solar cells are arrayed.

The bank 8 is formed by connecting, in series, a plurality of battery modules 7 in each of which a plurality of battery cells 6 such as lithium ion secondary batteries are connected to each other in series. The plurality of banks 8 are connected to each other in parallel. In FIG. 2, the bank 8 is formed by connecting three battery modules 7. However, the present invention is not limited to such a structure.

The conveyance apparatus 20 is, for example, a glider. Alternatively, the conveyance apparatus 20 may be a parachute or a drone.

The controller 9 includes a control unit 91, a memory unit 92, an input unit 93, a communication unit 94, a motor drive unit 95, a first separation unit 96, and a second separation unit 97.

The control unit 91 includes, for example, a central processing unit (CPU), a read only memory (ROM), a random access memory (RAM), and the like, and controls the operations of the respective parts of the HAPS 1. The control unit 91 executes processing of a separation control by reading and executing a separation control program 921 described later. The processing of the separation control refers to processing where the banks 8 are separated and are transferred to the conveyance apparatus 20, the conveyance apparatus 20 is separated from the HAPS 1, and the conveyance apparatus 20 is made to land on a ground, in a case where an internal short-circuit has occurred in the battery cell 6 of the bank 8, a temperature of the battery cell 6 is equal to or above a first threshold, an SOH of the bank 8 is equal to or below a second threshold, or an SOC is equal to or below a third threshold.

The memory unit 92 stores various programs including a separation control program 921 and a history database (DB) 922. The separation control program 921 is provided in a state where the separation control program 921 is stored in a computer-readable recording medium 90 such as a CD-ROM, a DVD-ROM, or a USB memory, for example. The separation control program 921 is stored in the memory unit 92 by installing the separation control program 921 in the controller 9. Alternatively, the separation control program 921 may be acquired from an external computer (not illustrated) that is connected to a communication network, and may be stored in the memory unit 92.

The history DB 922 may store history data of power generation and discharge of the solar panel 5, history data of charge and discharge of the banks 8, history data of temperatures of the banks 8, history data of weather information, history data of a flight control of the HAPS 1, history data of separation of the banks 8, and the like. The history of power generation and discharge of the solar panel 5 is an operation history of the solar panel 5, and may include a history of information indicating a use period, information regarding power generation (electricity or the like), or information regarding discharge (voltage, rate, and the like). The history of charge and discharge of the bank 8 is an operation history of the bank 8, and may include a history of information indicating a use period and information regarding charge or discharge (voltage, rate, and the like).

The history of weather information may be a history of a wind speed, a wind direction, an amount of sun light, and the like at the position of the HAPS 1 at the time of acquisition from a weather server 40.

The history of the flight control may be the history of the control of the flight of the HAPS 1 including rotational driving such as a rotational speed and a rotation time of the motor 16.

The history data of the separation of the bank 8 may be the history of the ID No. of the bank 8 that is separated by the control unit 91 and the date and time of the separation.

The input unit 93 receives inputting of detection results of currents and voltages of the solar panel 5 and the banks 8. In FIG. 2, an ammeter and a voltmeter are omitted.

The communication unit 94 has a function of performing communication between the communication unit 94 and other devices such as the wireless relay stations 10, and performs the transmission and reception of predetermined information.

The motor drive unit 95 controls the rotational driving of the respective motors 16 of the respective propellers 3.

The first separation unit 96 separates the target bank 8 by a switching unit 17 described later.

The second separation unit 97 separates the conveyance apparatus 20 from the HAPS 1 and conveys the bank 8 to the ground.

The first converter circuit 11 is a DC/DC converter, is connected to the solar panel 5, and boosts and outputs an output voltage of the solar panel 5.

The second converter circuit 12 is connected to the banks 8. The second converter circuit 12 is a bidirectional DC/DC converter that performs discharge and charge of the banks 8. The connection between each bank 8 and the second converter circuit 12 is turned on or off by the switching unit 17. The switching unit 17 includes a switch 171, and turns on or off the supply of electricity to the bank 8 by opening or closing the switch 171. The bank 8 with the switch 171 in an ON state is connected to the second converter circuit 12. When the bank 8 is separated as described later, the bank 8 is separated at the switching unit 17.

The inverter circuit 14 converts a direct current (DC) into an alternating current (AC). That is, the inverter circuit 14 converts DC power inputted from the switching unit 13 into AC power and outputs the AC power.

The switching unit 13 includes, for example, two switches 131 and 132 that are connected in series. In FIG. 2, a control circuit for controlling charge and discharge is omitted. The switch 131 and the switch 132 are each formed of a switching element such as a relay or a power MOSFET. A node between the switch 131 and the switch 132 is connected to the inverter circuit 14. The other end of the switch 131 and the other end of the switch 132 are respectively connected to the first converter circuit 11 and the second converter circuit 12.

Loads such as the wireless relay station 10, the motor 16 and the like are connected to the inverter circuit 14.

When discharge of electricity is performed from the solar panel 5 to the load, the switch 131 is turned on so as to connect the solar panel 5 to the load.

When discharge of electricity is performed from the banks 8 to a load, the switch 132 is turned on so as to connect the bank 8 to the load. FIG. 2 illustrates a state where the switch 132 is in an ON state so that electricity is supplied from the bank 8 to the load.

In a case where discharge of electricity is performed from the solar panel 5 and the banks 8 to the load, both the switch 131 and the switch 132 are turned on so as to connect the solar panel 5 and the banks 8 to the load.

The wireless relay station 10 includes a first communication unit 101, a second communication unit 102, and a third communication unit 103.

The first communication unit 101 includes an antenna, a transmitter-receiver duplexer, an amplifier, and the like. The first communication unit 101 performs the transmission and the reception of wireless signals between the first communication unit 101 and a terminal apparatus 30 that a user uses in an airplane, a communication terminal apparatus 30 of a drone, or the like. The second communication unit 102 includes an antenna, a transmitter-receiver duplexer, an amplifier, and the like. The second communication unit 102 performs the transmission and the reception of wireless signals between the second communication unit 102 and relay stations on the ground or on the sea. The wireless relay station 10 is connected to a network NW that is a mobile communication network via the relay station described above. A terminal apparatus 30 is connected to the network NW, and the weather server 40 is also connected to the network NW. In FIG. 2, the relay stations on the ground or on the sea are omitted. The third communication unit 103 performs the transmission and the reception between the third communication unit 103 and an artificial satellite and other HAPS by laser light or the like. The configuration of the wireless relay station 10 is not limited to the configuration described in this example.

The motor 16 rotationally drives the propeller 3. Alternatively, the motor 16 may drive a flying object propulsion apparatus or a flying object ascending apparatus other than the corresponding apparatuses illustrated in FIG. 1.

Figure 3:
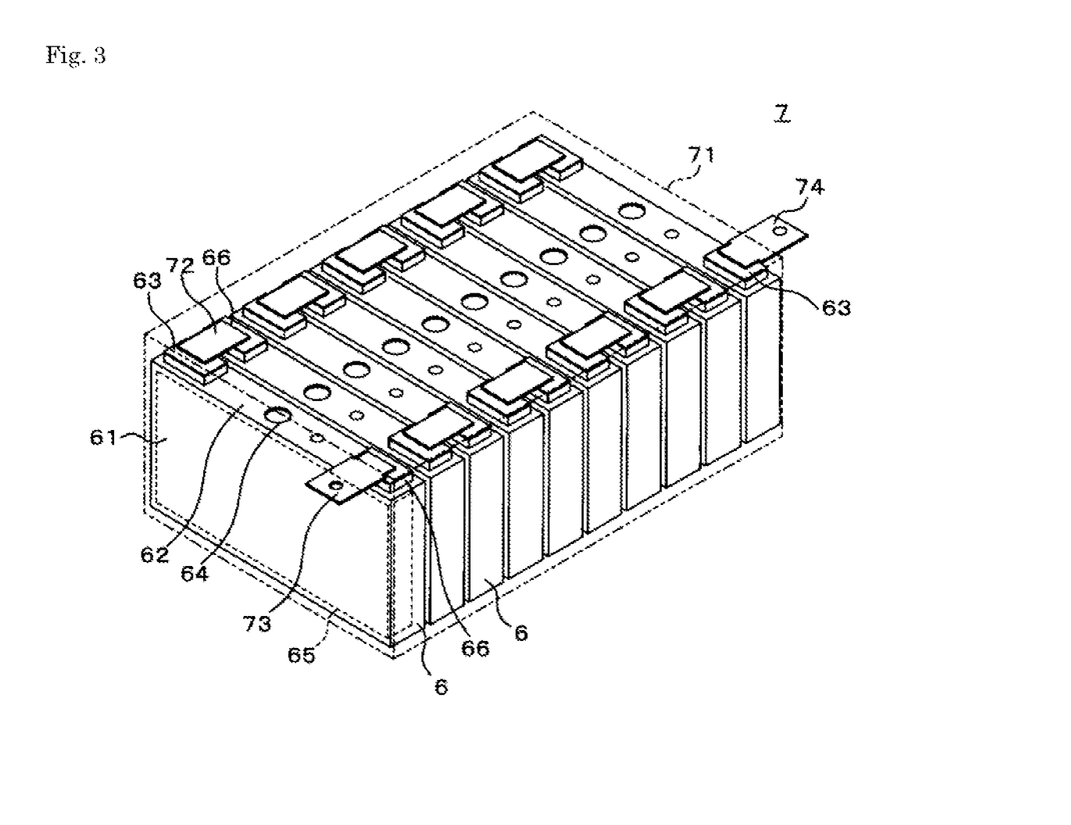
FIG. 3 is a perspective view of an energy storage apparatus.

FIG. 3 is a perspective view illustrating an example of the battery module 7.

The battery module 7 includes a rectangular parallelepiped case 71 and a plurality of battery cells 6 accommodated in the case 71.

The battery cell 6 includes a rectangular parallelepiped (prismatic) case body 61, a lid plate 62, a positive electrode terminal 63 and a negative electrode terminal 66 mounted on the lid plate 62, a rupture valve 64, and an electrode assembly 65. Instead of the prismatic cell, the battery cell 6 may be a so-called pouch cell having a laminate case. The electrode assembly 65 is formed by laminating a positive electrode plate, a separator and a negative electrode plate, and is accommodated in the case body 61.

The electrode assembly 65 may be obtained by winding a positive electrode plate and a negative electrode plate in a flat shape with a separator interposed therebetween. Alternatively, the electrode assembly 65 may be obtained by laminating a plurality of positive electrode plates and a plurality of negative electrode plates with a separator interposed therebetween.

The positive electrode plate is formed by forming an active material layer on a positive electrode substrate material foil which is a plate-like (sheet-like) or long strip-like metal foil made of metal such as aluminum, titanium, tantalum, or stainless steel or an alloy thereof. The negative electrode plate is formed by forming an active material layer on a negative electrode substrate material foil which is a plate-like (sheet-like) or long strip-like metal foil made of metal such as copper, nickel, stainless steel, nickel-plated steel, or an alloy thereof. The separator is a microporous sheet made of a synthetic resin.

In the above-described battery cell 6, it is preferable that, in a case where the battery cell 6 reaches the lower limit voltage described above, the battery cell 6 can generate a predetermined discharge capacity in a voltage range lower than the lower limit voltage. As a result, energy for making the HAPS 1 descend can be generated.

It is preferable that the battery cell 6 be configured such that lithium ions are dissolved in an electrolyte solution (nonaqueous electrolyte) from the negative electrode and the lithium ions are transmitted to the positive electrode in a voltage range lower than the lower limit voltage. Lithium ions can be transferred from the negative electrode to the positive electrode in a voltage range lower than the lower limit voltage and hence, a desired amount of a required discharge capacity can be ensured.

The positive active material can be appropriately selected from known positive active materials, for example. As a positive active material for a lithium ion secondary battery, a material capable of occluding and releasing lithium ions is usually used. Examples of the positive active material include a lithium transition metal composite oxide having an $\alpha$-NaFeO$_2$-type crystal structure and a lithium transition metal oxide having a spinel-type crystal structure or the like. As examples of the lithium transition metal composite oxide having an $\alpha$-NaFeO$_2$-type crystal structure, Li [Li$_x$Ni$_{1-x}$] O$_2$ ($0 \leq x < 0.5$), Li [Li$_x$Ni$_y$Co$_{(1-x-y)}$] O$_2$ ($0 \leq x < 0.5$, $0 < y < 1$), Li [Li$_x$Co$_{(1-x)}$] O$_2$ ($0 \leq x < 0.5$), Li [Li$_x$Ni$_y$Mn$_{(1-x-y)}$] O$_2$ ($0 \leq x < 0.5$, $0 < y < 1$), Li [Li$_x$Ni$_y$Mn$\beta$Co$_{(1-x-y-\beta)}$] O$_2$ ($0 \leq x < 0.5$, $0 < y$, $0 < \beta$, $0.5 < y+\beta \leq 1$), and Li [Li$_x$Ni$_y$Co$\beta$Al$_{(1-x-y-\beta)}$] O$_2$ ($0 \leq x < 0.5$, $0 < y$, $0 < \beta$, $0.5 < y+\beta < 1$) and the like are named. Examples of the lithium transition metal oxide having a spinel-type crystal structure include Li$_x$Mn$_2$O$_4$ and Li$_x$Ni$_y$Mn (2-$y$) O$_4$. These materials may have surfaces coated with other materials. In the positive active material layer, one kind of these materials may be used alone, or two or more kinds thereof may be used in mixture. In the positive active material layer, one kind of these compounds may be used alone, or two or more kinds of these compounds may be used in mixture. The content of the positive active material in the positive active material layer is not particularly limited, but the lower limit thereof is preferably 50 mass %, more preferably 80 mass %, and still more preferably 90 mass %. An upper limit of the content is preferably 99 mass %, and more preferably 98 mass %.

The positive composite forming the active material layer of the positive electrode contains optional components such as a conductive agent, a binder, a thickener, and a filler when necessary. Examples of the conductive agent include carbonaceous materials such as carbon black, metals, and conductive ceramics. Examples of the binder include thermoplastic resins such as fluororesins (polytetrafluoroethylene (PTFE), polyvinylidene fluoride (PVDF), and the like), polyethylene, polypropylene, and polyimide. Examples of the thickener include polysaccharide polymers such as carboxymethyl cellulose (CMC) and methyl cellulose. Examples of the filler include polyolefins such as polypropylene and polyethylene.

The negative active material used for the negative active material layer preferably contains lithium metal. The negative active material contains lithium metal and hence, excessive lithium ions are contained in the negative active material. Accordingly, lithium ions are transferred from the negative electrode to the positive electrode, so that a required discharge capacity can be generated. The lithium metal includes lithium alloy in addition to lithium alone. Examples of the lithium alloy include a lithium aluminum alloy, and the like, for example. The negative electrode containing lithium metal can be manufactured by cutting lithium metal into a predetermined shape or molding the lithium metal into a predetermined shape.

Furthermore, the negative active material layer may contain elements such as Na, K, Ca, Fe, Mg, Si, and N.

A lower limit of the content of the lithium metal in the negative active material is preferably 80 mass %, more preferably 90 mass %, and still more preferably 95 mass %. The upper limit of the content may be 100 mass %.

The case body 61 is filled with electrolyte solution. The electrolyte solution contains a nonaqueous solvent, a sulfur-based cyclic compound, a fluorinated cyclic carbonate, a chain carbonate, and an electrolyte salt dissolved in the nonaqueous solvent. Examples of the sulfur-based cyclic compound include compounds having a sultone structure or a cyclic sulfate structure or the like. Examples of the fluorinated cyclic carbonate include fluoroethylene carbonate or the like. Examples of the chain carbonate include ethyl methyl carbonate or the like.

The negative active material of the battery cell 6 may contain lithium metal, and the positive active material may be a lithium-excess type. According to such a battery cell 6, a high discharge capacity can be exhibited.

As the positive active material, NCM (Ni+Co+Mn-based mixed positive active material) represented by $Li_x (Ni_a Co_b Mn_c) O_2$ (a+b+c=1, 0<x<1.1) or the like may be used. In order to realize high energy density of the battery cell 6, the content of Ni may be increased.

The plurality of battery cells 6 are connected to each other in series by electrically connecting the positive electrode terminal 63 and the negative electrode terminal 66 of battery cells 6 of the battery module 7 that are disposed adjacently to each other by bus bars 72.

A positive electrode lead 74 and a negative electrode lead 73 for extracting electricity are mounted on the positive electrode terminal 63 and the negative electrode terminal 66 of the battery cells 6 at both ends of the battery module 7.

After the HAPS 1 takes off obliquely upward away from the ground, the HAPS 1 floats by lift while turning in a predetermined horizontal area, and ascends to an airspace A. As the airspace A, an airspace in the stratosphere at an altitude of 11 km to 50 km, for example, is named. Particularly, an airspace at an altitude of 20 km is preferable. After ascending to the airspace A, the HAPS 1 horizontally moves to a position B in the horizontal direction and stays at the position B. At night, the drone glides in the airspace A while turning with a downward angle.

In this embodiment, when the control unit 91 determines that it is necessary to separate the bank 8 from the HAPS 1 during its flight, the bank 8 is separated from the HAPS 1.

Hereinafter, the control processing of separating the bank 8 from the HAPS 1 by the control unit 91 is described.

Figure 4:
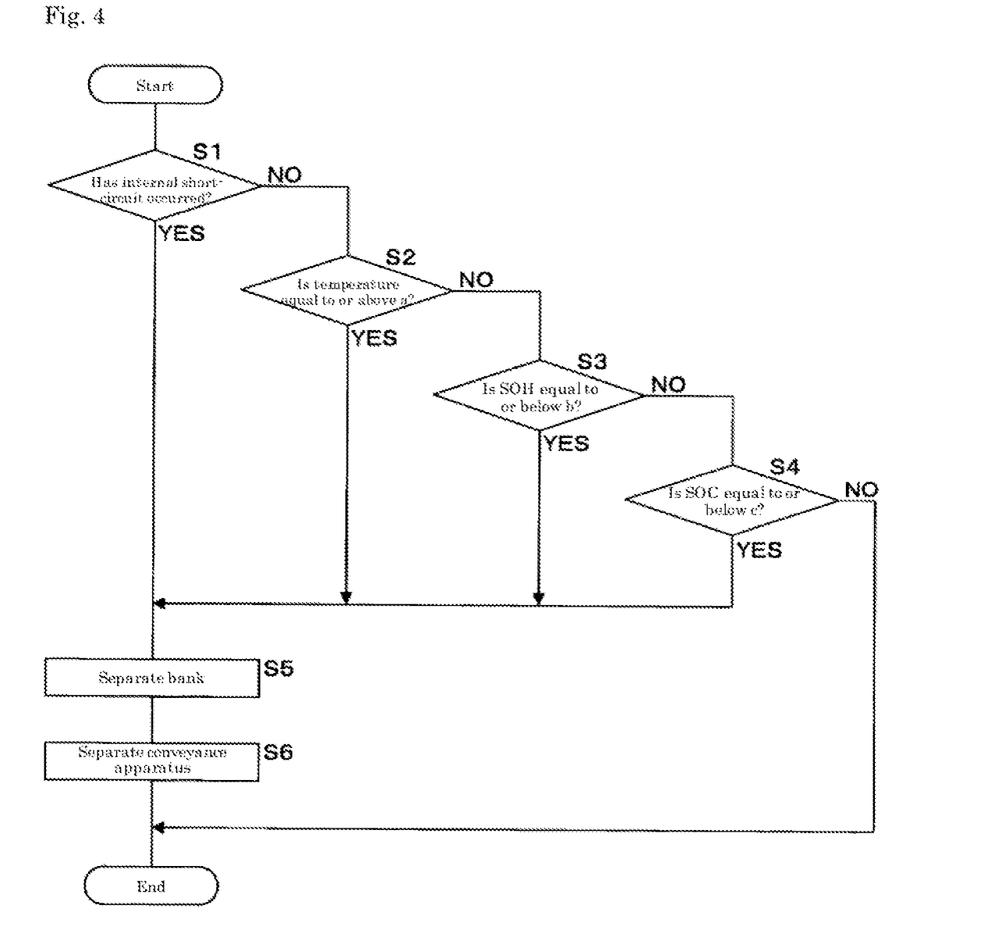
FIG. 4 is a flowchart illustrating steps of processing of a separation control by a control unit according to the first embodiment.

FIG. 4 is a flowchart illustrating steps of processing of a separation control performed by the control unit 91.

The control unit 91 determines whether or not an internal short-circuit has occurred in the bank 8 (S1). When the internal short-circuit has occurred (S1: YES), the control unit 91 advances the processing to S5.

When an internal short-circuit has not occurred (S1: NO), the control unit 91 determines whether or not a temperature of at least one battery cell 6 is equal to or above the first threshold a (S2). The first threshold a is set as described above. When the temperature of the battery cell 6 is equal to or above the first threshold a (S2: YES), the control unit 91 advances the processing to S5.

When the temperature of none of battery cells 6 is equal to or above the first threshold a (S2: NO), the control unit 91 determines whether or not the SOH of the entire banks 8 is equal to or below the second threshold b (S3). The second threshold b is set as described above. When the SOH is equal to or below the second threshold b (S3: YES), the control unit 91 advances the processing to S5.

When the SOH is not equal to or below the second threshold b (S3: NO), the control unit 91 determines whether or not the SOC of the entire bank 8 is equal to or below the third threshold c (S4). The third threshold c is set as described above. When the SOC is equal to or below the third threshold c (S4: YES), the control unit 91 advances the processing to S5. When the SOC is not equal to or below the third threshold c (S4: NO), the control unit 91 finishes the processing. The control unit 91 performs the processing of S1 to S4 on the respective banks 8.

In S5, the control unit 91 turns off the switch 171 of the switching unit 17 corresponding to the bank 8, and separates the bank 8 from the HAPS 1.

The control unit 91 conveys the separated bank 8 to the conveyance apparatus 20 using a robot arm or the like, separates the conveyance apparatus 20 on which the bank 8 is mounted from the HAPS 1 (S6), and finishes the processing. In a case where the conveyance apparatus 20 is a glider, the conveyance apparatus 20 will glide down and conveys the bank 8 to the target landing point. In a case where the conveyance apparatus 20 is a drone, a drive device of the conveyance apparatus 20 is driven by discharging electricity from the bank 8 mounted on the conveyance apparatus 20 after separation, and the conveyance apparatus 20 lands on the target point.

In the case where battery cell 6 is configured as described above, the bank 8 can discharge even when the battery cell 6 reaches a lower limit voltage or less.

In this embodiment, when the SOC is equal to or below the third threshold c so that the bank 8 cannot be used, such a bank 8 is separated. Accordingly, it is possible to make the HAPS 1 keep flying or to extend a millage of the HAPS 1 whereby the reliability of the flight can be enhanced. In a case where a temperature of the battery cell 6 is equal to or above the first threshold a or the SOH of the battery cell 6 is equal to or below the second threshold b so that the degree of deterioration of the bank 8 is large or an internal short-circuit has occurred in the bank 8, the bank 8 is separated from the HAPS 1, and charge and discharge of the HAPS 1 are continued by other banks 8. Accordingly, it is possible to make the HAPS 1 keep flying or extend the mileage of the HAPS 1 and hence, the reliability of the flight of the HAPS 1 can be enhanced. Accordingly, the reliability of the flight operation can be enhanced. The HAPS 1 glides in the airspace A at the position B during the normal operation and hence, it is possible to estimate the position at which the HAPS 1 lands by making the conveyance apparatus 20 descend from the position B.

It must be noted that the present invention is not limited to the case where the bank 8 is separated. The battery module 7 or the battery cell 6 may be separated. In addition, the bank 8 may be mounted in the conveyance apparatus 20 and the degree of deterioration of the bank 8 is large, the bank 8 may be separated together with the conveyance apparatus 20.

Second Embodiment

Figure 5:
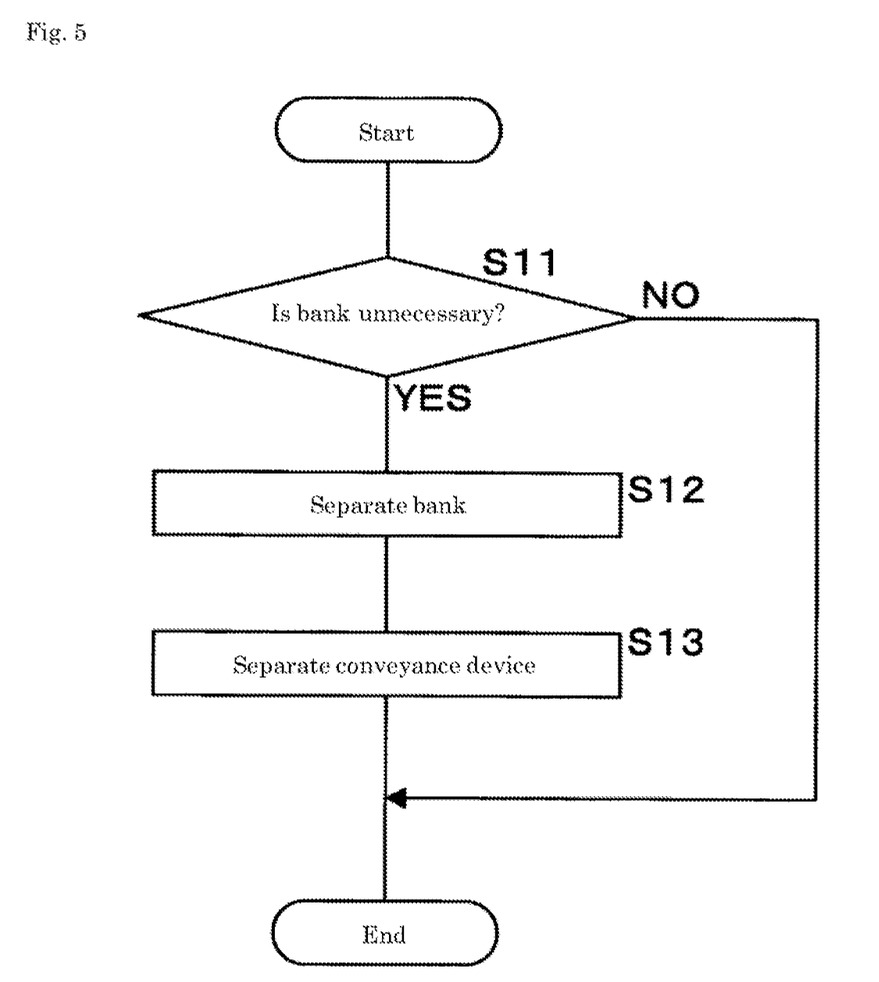
FIG. 5 is a flowchart illustrating steps of processing of a separation control by a control unit according to the second embodiment.

FIG. 5 is a flowchart illustrating steps of processing of a separation control by a control unit 91 according to the second embodiment.

The control unit 91 determines whether or not the specific bank 8 is unnecessary (S11). The control unit 91 determines whether or not some banks 8 become unnecessary based on whether or no take-off or the like is performed or based on whether or not a predetermined period has elapsed, or the like. On the basis of the power required for take-off of the HAPS 1, the power required for the operation of the HAPS 1 in the daytime and the nighttime, the power generation amount of the solar panel 5, and the like, the bank 8 that becomes unnecessary after take-off may be determined including the number of battery modules 7 constituting the bank 8. In a case where the HAPS 1 includes a plurality of banks 8 having different use periods, it may be possible to determine that the bank 8 for which a predetermined period has elapsed after its use is started is no more necessary. When the bank is not unnecessary (S11: NO), the control unit 91 finishes the processing.

When the bank is unnecessary (S11; YES), the control unit 91 turns off a switch 171 of a switching unit 17 of the corresponding bank 8, and separates the bank 8 (S12).

The control unit 91 conveys the separated bank 8 to a conveyance apparatus 20 using a robot arm or the like, separates the conveyance apparatus 20 from the HAPS 1 (S13), and finishes the processing. The conveyance apparatus 20 descends while gliding, and conveys the bank 8.

In this embodiment, it is possible to make the HAPS 1 lightweight by separating the bank 8 from the HAPS 1 and hence, it is possible to make the HAPS 1 keep flying and extend a millage whereby reliability of the flight of the HAPS 1 can be enhanced.

The above embodiments are not restrictive. The scope of the present invention is intended to include all modifications within the meaning and scope equivalent to the claims.

The generator is not limited to the solar cell. It is preferable that the emission of carbon dioxide at the time of operating the generator be smaller than the emission of carbon dioxide at the time of driving an internal combustion engine.

The present invention is not limited to a case where the controller 9 is mounted on the HAPS 1. A computer or a server that is connected to the HAPS 1 by wireless communication may control the separation of the bank 8.

The HAPS 1 is not limited to a solar plane. The HAPS 1 may be an airship, a stratospheric jet plane or the like.

The flying object is not limited to the HAPS. The present invention is applicable to other electric flying objects such as an eVTOL and a hybrid flying object which mounts a generator and an internal combustion engine thereon.

The present invention is also applicable to a flying object that includes an energy storage apparatus but does not include a generator. For example, in a case where the SOH of the energy storage apparatus becomes equal to or below the second threshold so that the degree of deterioration of the energy storage apparatus is large or an internal short-circuit occurs in the energy storage device, a separation control according to the present invention is performed.

The energy storage device is not limited to a lithium ion secondary battery. The energy storage device may be other secondary batteries or capacitors.

The invention claimed is:

1. A flying object comprising:
    a generator having a solar cell and configured to supply electricity to a flying object propulsion apparatus;
    an energy storage apparatus having a plurality of energy storage devices and configured to supply electricity to the flying object propulsion apparatus; and
    a conveyance apparatus that is selectively separatable from the flying object to convey only a portion of the plurality of the energy storage devices that are also separated from the energy storage apparatus away from the energy storage apparatus and the flying object.

2. The flying object according to claim 1, further comprising a wireless relay station that performs wireless communication between the wireless relay station and a terminal apparatus.

3. The flying object according to claim 1, wherein the energy storage apparatus is formed by connecting, in parallel, a plurality of series connection circuits, each of which is formed by connecting a plurality of energy storage devices in series, and the series connection circuits are separated from the energy storage apparatus.

4. The flying object according to claim 1, wherein one or more of the plurality of the energy storage devices are separated in a case where an internal short-circuit has occurred, a temperature of the energy storage device is equal to or above a first threshold, an SOH is equal to or below a second threshold, or an SOC is equal to or below a third threshold.

5. The flying object according to claim 1, wherein the conveyance apparatus comprises a glider or a parachute.

6. The flying object according to claim 1, wherein the conveyance apparatus comprises a drone having a drive device and a controller.

7. The flying object according to claim 6, wherein the drive device of the drone is driven by discharging electricity from the portion of the plurality of energy storage devices after separation thereof from the energy storage apparatus.

8. The flying object according to claim 1, wherein the portion of the plurality of energy storage devices separated from the energy storage apparatus generate, after separation, a predetermined discharge capacity in a voltage range that is lower than a lower limit voltage.

9. The flying object according to claim 1, wherein each of the energy storage devices is a prismatic battery cell.

10. The flying object according to claim 1, wherein each of the energy storage devices is a pouch battery cell.

* * * * *